(12) United States Patent
Soderlind et al.

(10) Patent No.: US 12,722,684 B2
(45) Date of Patent: Sep. 1, 2026

(54) METHODS AND APPARATUS TO COUPLE A STEERING COLUMN TO A HOUSING

(71) Applicant: Ford Global Technologies, LLC, Dearborn, MI (US)

(72) Inventors: Erik William Soderlind, Harrison Township, MI (US); Steven Bryan Amburgy, Commerce Township, MI (US); Taras Andrew Palczynski, Jr., Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 19/044,160

(22) Filed: Feb. 3, 2025

(65) Prior Publication Data

US 2026/0225642 A1 Aug. 6, 2026

(51) Int. Cl.
*B62D 1/16* (2006.01)

(52) U.S. Cl.
CPC .................................... *B62D 1/16* (2013.01)

(58) Field of Classification Search
CPC .......... B62D 1/185; B62D 1/184; B62D 1/16; B62D 7/224; F16F 1/373
USPC ................................................... 74/492, 493
See application file for complete search history.

(56) References Cited

U.S. PATENT DOCUMENTS

| | | | | |
|---|---|---|---|---|
| 5,992,191 | A * | 11/1999 | Nickeas | B60R 25/0222 70/218 |
| 6,357,320 | B1 * | 3/2002 | Ford | B62D 1/10 74/552 |
| 7,055,647 | B2 * | 6/2006 | Daniel | B62D 1/187 180/444 |
| 7,407,190 | B2 | 8/2008 | Berg et al. | |
| 8,102,138 | B2 | 1/2012 | Sekine et al. | |
| 9,849,904 | B2 | 12/2017 | Rouleau | |
| 10,000,229 | B2 | 6/2018 | Matsuno et al. | |
| 10,479,394 | B2 * | 11/2019 | Kato | B62D 5/0409 |
| 10,577,025 | B2 | 3/2020 | Michler et al. | |
| 10,875,567 | B2 * | 12/2020 | Sekiguchi | B62D 1/185 |
| 11,186,308 | B2 | 11/2021 | Kwon et al. | |
| 11,325,635 | B2 * | 5/2022 | Ko | B62D 1/04 |
| 11,453,429 | B2 * | 9/2022 | Helmstetter | B62D 1/04 |
| 2019/0276068 | A1 * | 9/2019 | Sekiguchi | B62D 1/185 |

* cited by examiner

*Primary Examiner* — Toan C To
(74) *Attorney, Agent, or Firm* — Lorne Forsythe; Hanley, Flight & Zimmerman, LLC

(57) ABSTRACT

Methods and apparatus to couple a steering column to a housing are disclosed. An example apparatus disclosed herein includes a bracket fixed to a steering column assembly, the bracket including a bracket surface, and a housing including projections extending from a housing surface of the housing, the housing surface facing a same direction as the bracket surface, the projections including first portions and second portions, the first portions extending from the housing surface in a first direction, the second portions extending from the first portions in a second direction different than the first direction, the second portions of the projections to overlap the bracket surface.

20 Claims, 16 Drawing Sheets

1702
1906
1902
1906
1910
420
1914
1904
1908
1912
422
1906
1906

METHODS AND APPARATUS TO COUPLE A STEERING COLUMN TO A HOUSING

FIELD OF THE DISCLOSURE

This disclosure relates generally to vehicles and, more particularly, to methods and apparatus to couple a steering column to a housing.

BACKGROUND

Vehicles include a steering column control module (SCCM) to operatively couple a steering wheel to a steering column. The SCCM can transfer input from a driver to rotation of road wheels. Additionally, in vehicles having autonomous or semi-autonomous driving capabilities, the SCCM can relay an autonomous driving system input to rotation of the steering wheel.

SUMMARY

An example apparatus disclosed herein includes a bracket fixed to a steering column assembly, the bracket including a bracket surface, and a housing including projections extending from a housing surface of the housing, the housing surface facing a same direction as the bracket surface, the projections including first portions and second portions, the first portions extending from the housing surface in a first direction, the second portions extending from the first portions in a second direction different than the first direction, the second portions of the projections to overlap the bracket surface.

An example apparatus disclosed herein includes a bracket extending radially outward from a steering column assembly, the bracket including a first surface and a second surface opposite the first surface, and a housing coupled to the bracket, the housing including a housing surface and projections extending from the housing surface, the first surface of the bracket in contact with the housing surface, the second surface of the bracket in contact with the projections.

An example vehicle disclosed herein includes a steering column assembly including a steering column, a bracket fixedly coupled to the steering column assembly, the bracket including a first surface and a second surface opposite the first surface, and a housing coupled to the bracket, the housing including a housing surface and projections extending from the housing surface, the bracket positioned between the housing surface and the projections.

BRIEF DESCRIPTION OF THE DRAWINGS

In general, the same reference numbers will be used throughout the drawing(s) and accompanying written description to refer to the same or like parts. The figures are not necessarily to scale.

DETAILED DESCRIPTION

Methods and apparatus to couple a steering column to a housing are disclosed herein. The housing includes an opening through which a steering column extends to operatively couple to the steering wheel. The housing can correspond to a multifunction switch housing. A multifunction switch, also known as a combination switch, is an electronic switch that controls several vehicle functions. The multifunction switch can include switch circuitry for turn signals, headlights, windshield wipers, interior lights, washer pump, cruise control, hazard lights, etc. Further, the housing can include and/or be coupled to a SCCM. The SCCM can include a clock spring coil stator and a clock spring coil rotor to enable the steering wheel and the steering column to turn freely while maintaining electrical connections.

A steering column assembly includes the steering column and a steering column jacket is typically positioned around the steering column. The jacket can include and/or be coupled to a bracket extending radially outward therefrom. Further, the bracket can be coupled to the housing to enable the housing to support a load associated with the steering column.

In some previous instances, the bracket is coupled to the housing via fasteners. However, to avoid the clock spring stator, the fasteners are positioned radially outward thereof. As such, the bracket extends to an area of the housing not occupied by the clock spring stator to facilitate the coupling, which increases a size and a weight of the bracket.

Examples disclosed herein provide brackets and housings that are coupled via an interference fit and/or a transition fit.

As such, examples disclosed herein enable the size and/or the weight of the bracket to be reduced. Additionally, examples disclosed herein remove a need for additional parts (e.g., fasteners) to couple the bracket to the housing. Further, examples disclosed herein simplify operations performed to couple the housing to the bracket. In some examples, the housing is coupled to the bracket via a movement including solely translation. In some examples, the housing is coupled to bracket via a movement including a translation and a subsequent rotation.

Figure 1:
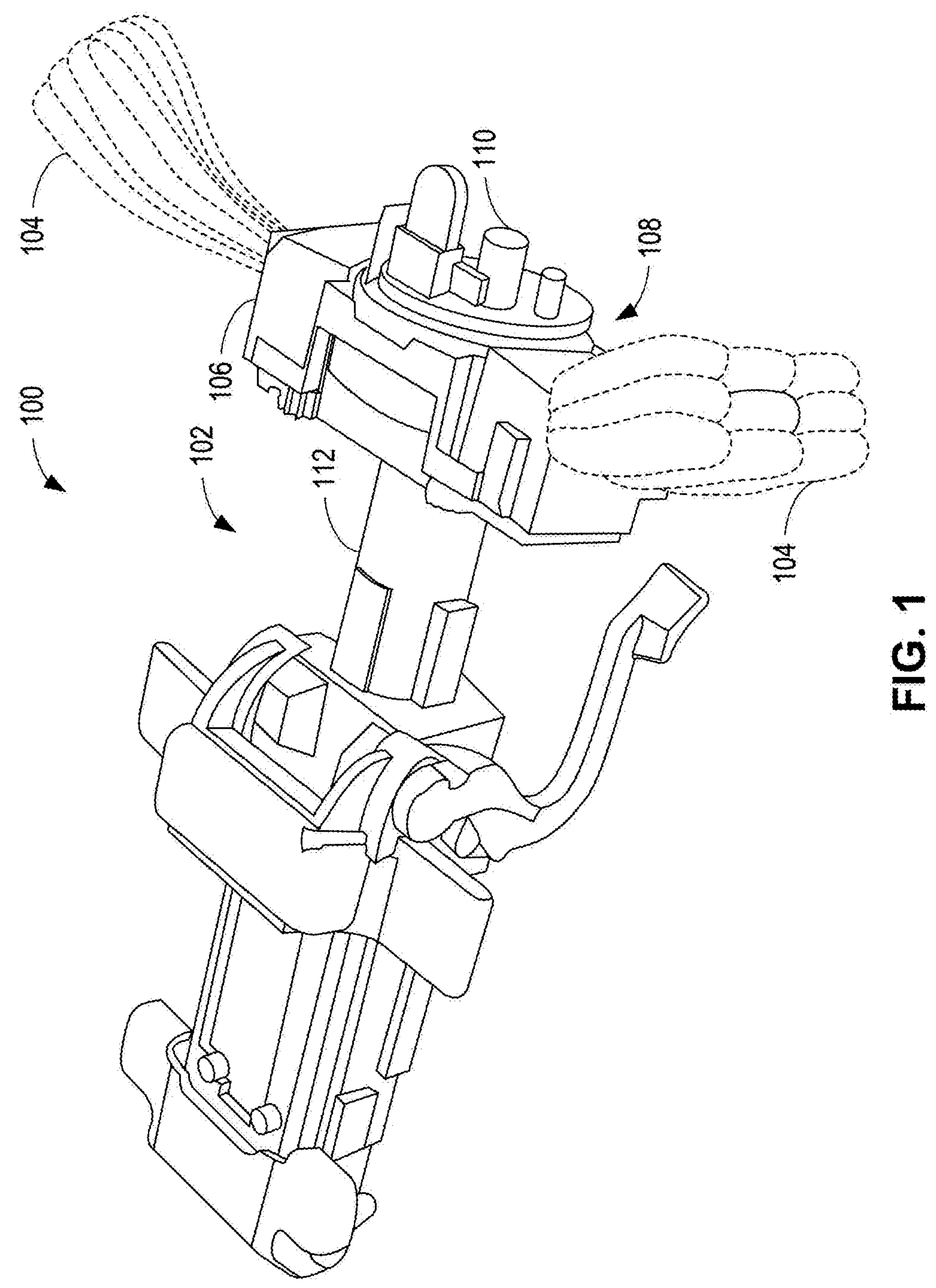
FIG. 1 illustrates an example vehicle system in which example housings and brackets disclosed herein can be implemented.

FIG. 1 illustrates an example system 100 in which examples disclosed herein can be implemented. Specifically, the system 100 includes a steering column assembly 102, multifunction switches 104, a housing 106 (e.g., a multifunction switch housing, a steering column control module housing), and a clock spring coil assembly 108. The multifunction switches 104 can include switch circuitry for turn signals, headlights, windshield wipers, interior lights, a washer pump, cruise control, hazard lights, etc. The steering column assembly 102 includes a steering column 110 and a steering column jacket 112 (e.g., a steering column sleeve) positioned around the steering column 110. FIGS. 2-19 below provide example configurations of the housing 106 and a bracket to couple the steering column assembly 102 (e.g., the steering column jacket 112) to the housing 106.

Figure 2:
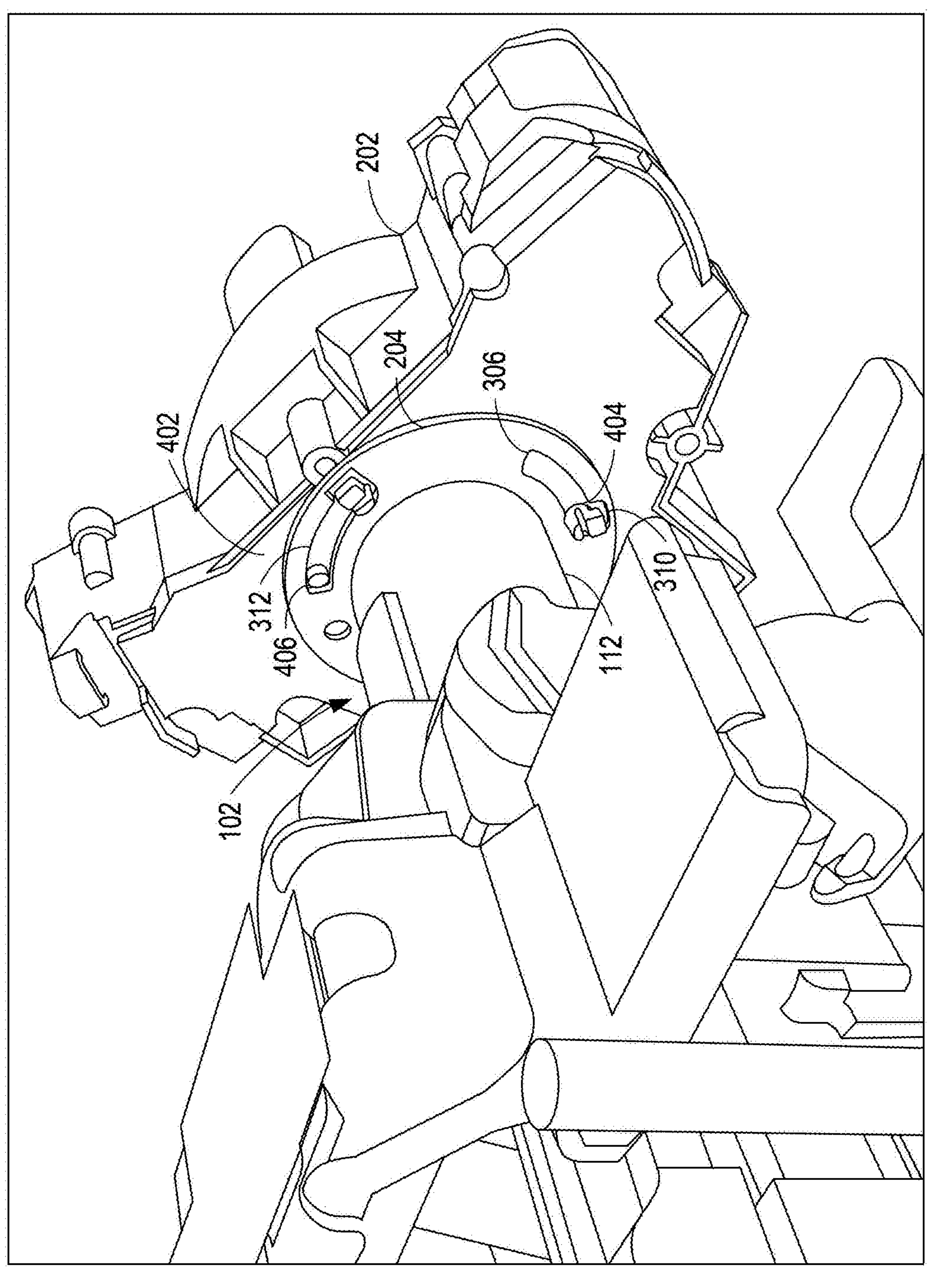
FIG. 2 illustrates a first example housing and a first example bracket that can be implemented in the vehicle system of FIG. 1.

FIG. 2 illustrates a first example housing 202 and a first example bracket 204. The bracket 204 is fixed to the steering column assembly 102. Specifically, the bracket 204 is fixedly coupled to and extends radially outward from the steering column jacket 112. In some examples, the bracket 204 is welded to the steering column jacket 112.

Figure 3:
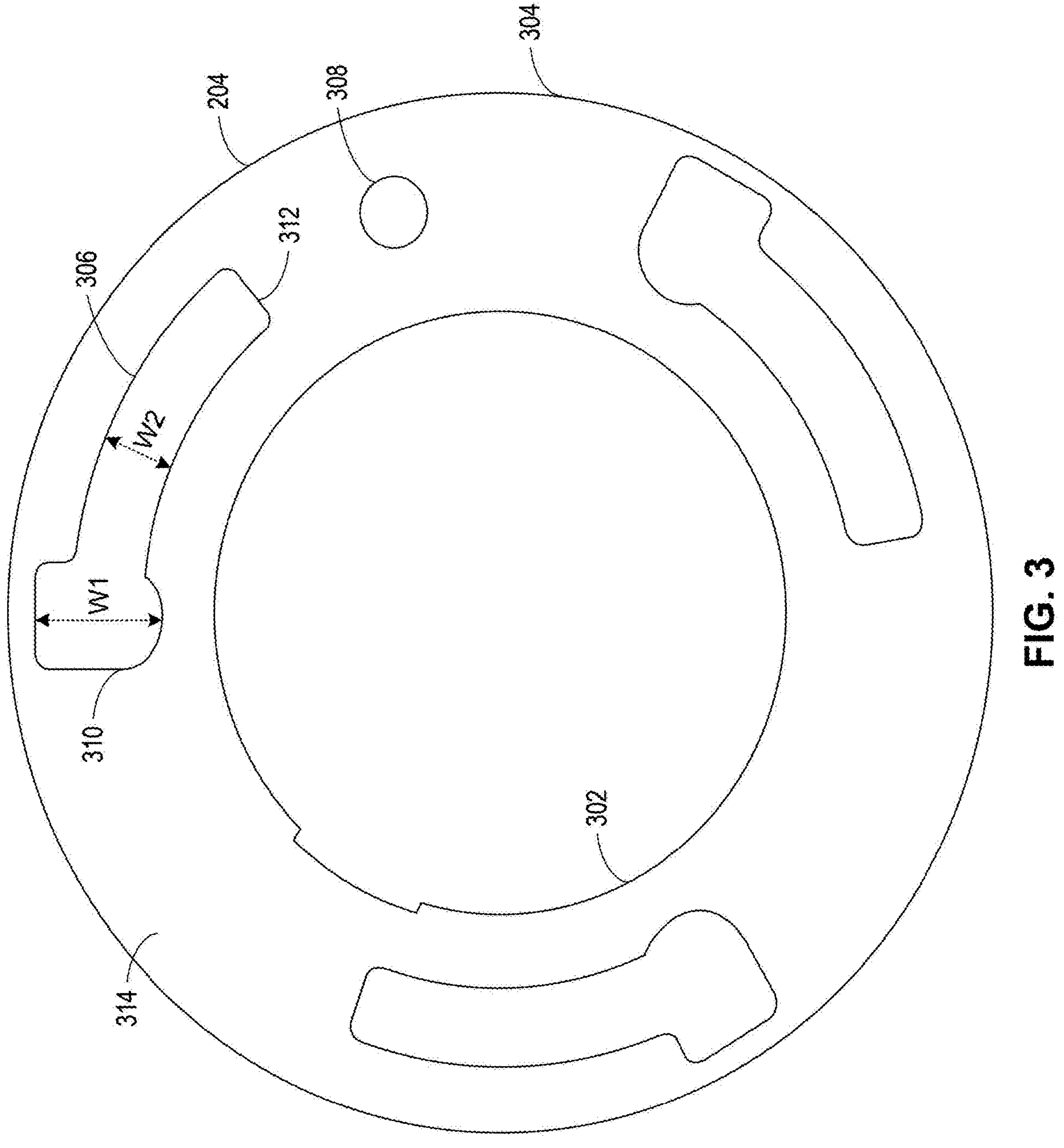
FIG. 3 is an isolated view of the first example bracket of FIG. 2.

FIG. 3 is an isolated view of the first example bracket 204 of FIG. 2. The bracket 204 includes an inner perimeter 302 (e.g., an inner diameter), an outer perimeter 304 (e.g., an outer diameter), apertures 306, and an orifice 308. The apertures 306 and the orifice 308 are positioned between the inner perimeter 302 and the outer perimeter 304. Each of the apertures 306 includes an enlarged circumferential end 310 and a slot 312 (e.g., a circumferential slot) extending from the circumferential end 310. Specifically, the enlarged ends 310 have a first width W1, and the slots 312 have a second width W2 smaller than the first width W1. Although the inner perimeter 302 and the outer perimeter 304 are circular, the inner and outer perimeters 302, 304 of the first example bracket 204 can have an alternative shape.

Figure 4:
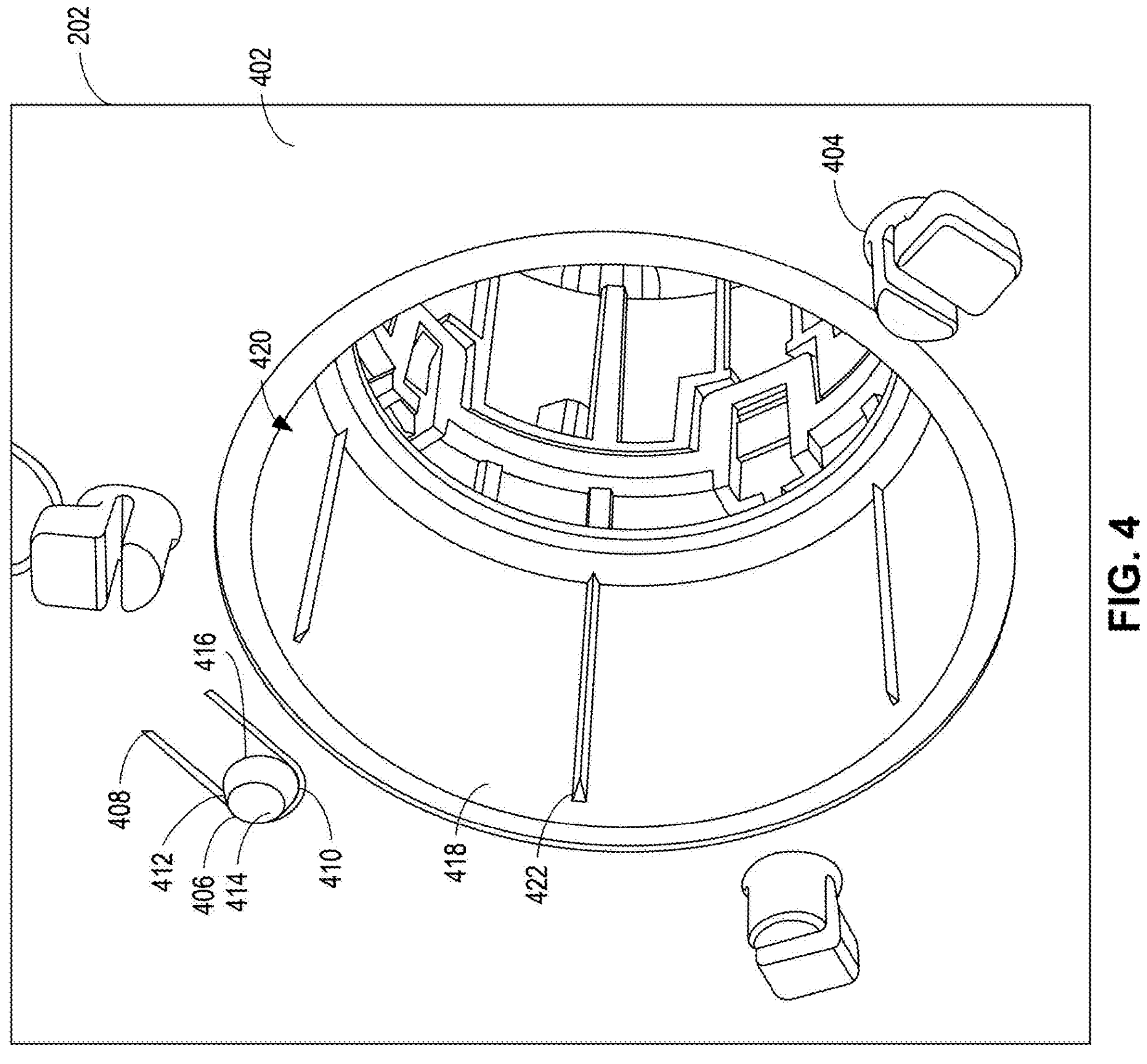
FIG. 4 is an isolated view of the first example housing of FIG. 2.

FIG. 4 is an isolated view of the first example housing 202 of FIG. 2. The housing 202 includes a surface 402, projections 404 extending from the surface 402, and a spring-loaded pin 406. The spring-loaded pin 406 extends from a portion of the surface 402 that includes a fixed end 408 and a movable end 410. The spring-loaded pin 406 is positioned proximate the movable end 410. The spring-loaded pin 406 is biased to the position shown in FIG. 4 in which the spring-loaded pin 406 extends past the surface 402 in a direction normal thereto. The spring-loaded pin 406 can move into the housing 202 in response to encountering a force that overcomes a spring force holding the spring-loaded pin 406 in the biased position, as discussed in further detail below. In some examples, the spring-loaded pin 406 includes a tapered side surface 412. Specifically, the tapered side surface 412 is angled to reduce a circumference of an outer face 414 relative to a base 416 in the spring-loaded pin 406. The tapered side surface 412 helps the bracket 204 (FIGS. 2-3) slide over the spring-loaded pin 406 during assembly, as discussed in further detail below.

Additionally, the housing 202 includes a tubular surface 418 positioned around an orifice 420 in which the steering column assembly 102 is to be positioned. Further, the housing 202 includes radial projections 422 (e.g., radial de-lash projections) protruding from the tubular surface 418 into the orifice 420. The radial projections 422 contact the steering column jacket 112 and prevent or otherwise reduce radial movement thereof when the bracket 204 is coupled to the housing 202 and the steering column jacket 112 is positioned in the orifice 420.

Figure 5:
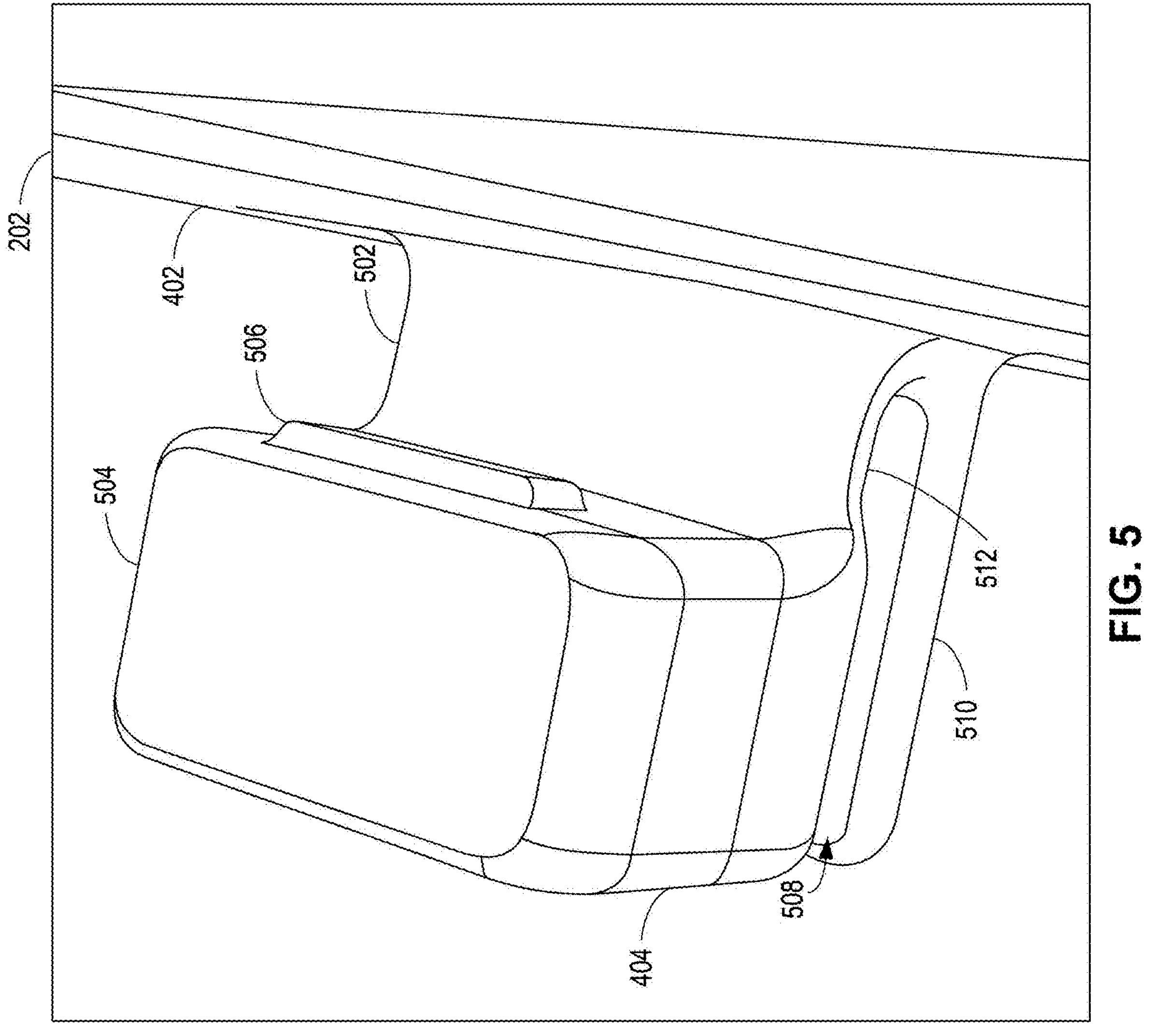
FIG. 5 is a magnified view of an example projection of the first example housing of FIGS. 2 and 4.

FIG. 5 is a magnified view of one of the projections 404 of the first example housing 202 of FIGS. 2 and 4. The projections 404 include a first portion 502, a second portion 504, a third portion 506, and a slit 508. The first portion 502 extends from the surface 402 in a first direction. For example, the first portion 502 can extend from the surface 402 in a direction normal to the surface 402.

The slit 508 extends at least partially through the first portion 502. For example, the slit 508 can extend through the first portion 502 in a direction normal to the surface 402. Accordingly, the slit 508 is positioned between and separates a first section 510 and a second section 512 of the first portion 502 of the projection 404.

The second portion 504 extends from the first portion 502 in a second direction. For example, the second portion 504 can extend from the first portion 502 in a direction normal to the first portion 502. In this example, the second portion 504 extends from the second section 512 of the first portion 502 of the projection 404. The third portion 506 extends from the second portion 504 towards the surface 402.

In some examples, the second portion 504 extends from the first portion 502 at an angle that positions the second portion 504 closer to the surface 402 as the separation from the first portion 502 increases. In such examples, the projections 404 may not include the third portion 506.

Referring now to FIGS. 2-5, during a first assembly operation to couple the housing 202 to the bracket 204 (e.g., a first coupling operation), the projections 404 are aligned with and move through the enlarged circumferential ends 310 of the apertures 306. Accordingly, the first assembly operation includes a translation (e.g., linear movement) of the housing 202 relative to the bracket 204 to position the projections 404 in the enlarged circumferential ends 310 of the apertures 306. Further, the bracket 204 includes a first surface 314 (FIG. 3) that contacts the housing surface 402 in response to the translation.

Figure 6:
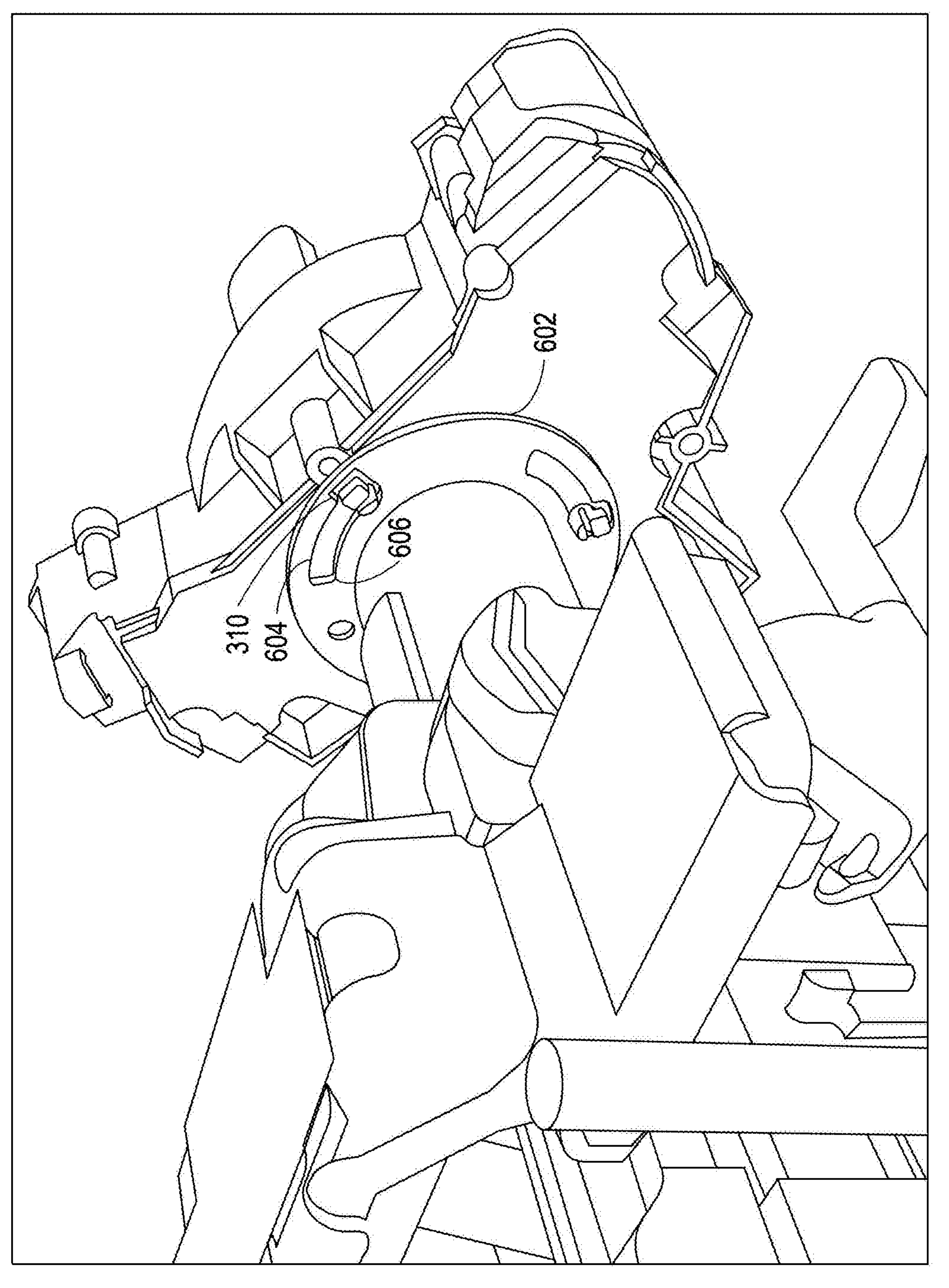
FIG. 6 is an isolated view of the first example housing of FIG. 2 coupled to the first example bracket of FIG. 2.

In the illustrated example of FIG. 2, the spring-loaded pin 406 is positioned in the slot 312 after the first assembly operation. FIG. 6 illustrates a second example bracket 602 after the first assembly operation. The second example bracket 602 is similar to the bracket 204 of FIGS. 2-4 except that the bracket 602 of FIG. 6 includes different slots 604. Specifically, the slots 604 have smaller channels 606 extending from the circumferential ends 310 than the slots 312 of the first example bracket 204 of FIGS. 2-4. As a result, the bracket 602 contacts and pushes the spring-loaded pin 406 (not shown) into the housing 202 during the first assembly operation.

Figure 7:
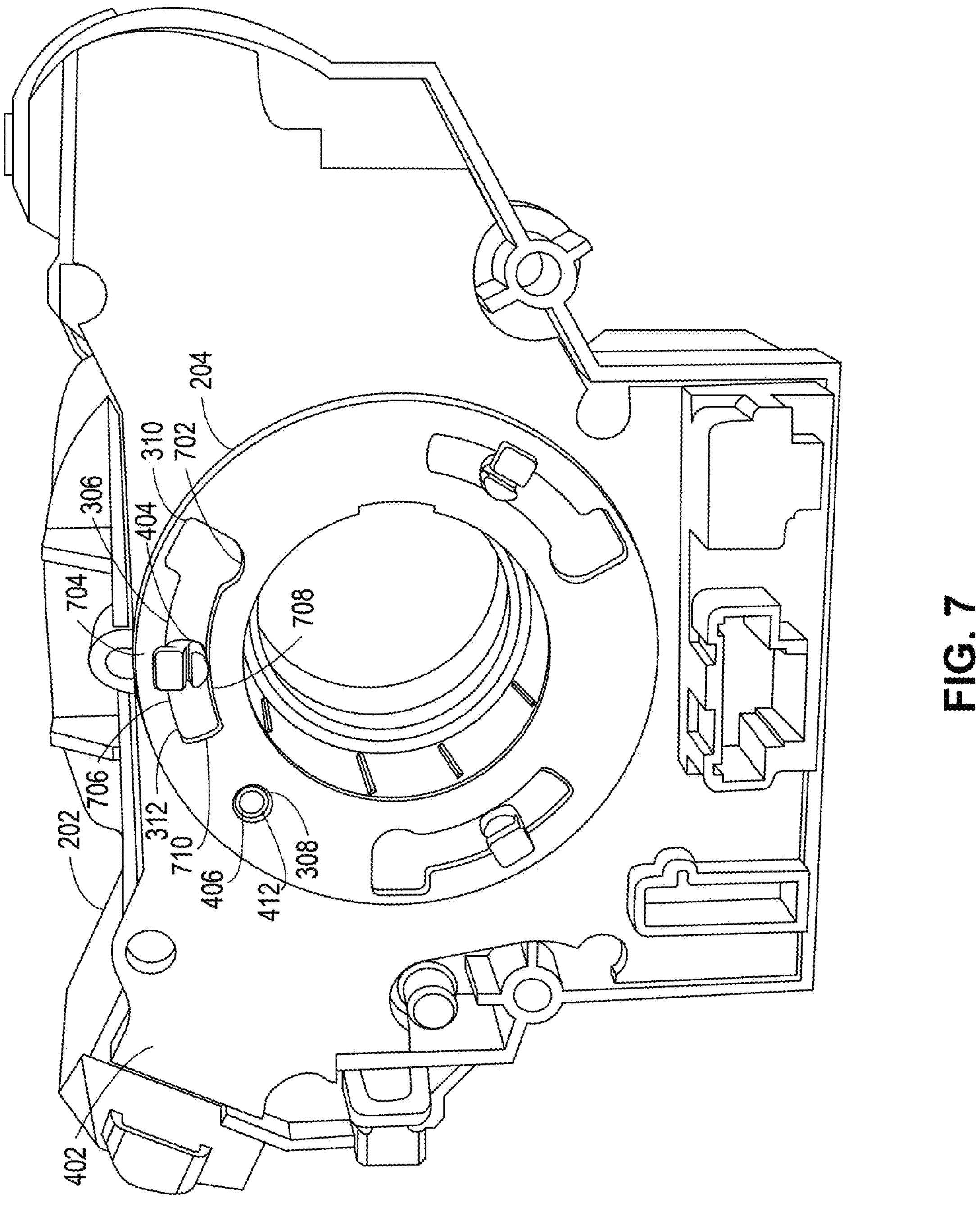
FIG. 7 illustrates the first example housing and a second example bracket that can be implemented in the vehicle system of FIG. 1.

FIG. 7 is an isolated view of the first example housing 202 coupled to the first example bracket 204. Specifically, during a second assembly operation to couple the housing 202 to the bracket 204 (e.g., a second coupling operation), the housing 202 is rotated relative to the bracket 204 to move the projections 404 from the enlarged circumferential ends 310 into the slots 312 of the apertures 306. In some examples, the enlarged circumferential ends 310 include grooves 702 to guide the projections 404 into the slots 312 in response to the rotation.

To secure the relative position of the housing 202 and the bracket 204, the projections 404 form an interference fit and/or a transition fit with the bracket 204. The third portion 506 (FIG. 5) of the projections 404 contact a second surface 704 of the bracket 204 when the projections 404 move into the slots 312. Specifically, a distance between the third portion 506 of the projections 404 and the housing surface 402 can be smaller than a thickness of the bracket 204 defined between the first surface 314 and the second surface 704 of the bracket 204. Thus, the contact between the third portion 506 of the projections 404 and the second surface 704 of the bracket 204 can form an interference fit (e.g., a first interference fit) and/or a transition fit (e.g., a first transition fit).

Additionally, in some examples, opposite sides 706, 708 of the slots 312 contact the first section 510 and the second section 512 of the first portion 502 of the projection 404. In some such examples, the slits 508 enable the first section 510 and the second section 512 of the first portion 502 of the projections 404 to move closer together (e.g., reducing a size of the slit 508) when the opposite sides 706, 708 of the slots 312 apply a compression force on the first portion 502 in response to movement thereof into the slots 312. That is, the first portion 502 of the projections 404 can have a width that is greater than the second width W2 prior to the first portion 502 moving into the slots 312, and the opposite sides 706, 708 of the slots 312 can compress the first portion 502 to the second width W2 when the first portion 502 moves into the slots 312. Accordingly, the slots 312 and the first portion 502 of the projection 404 can form another interference fit (e.g., a second interference fit) and/or another transition fit (e.g., a second transition fit) to increase a strength of the coupling between the housing 202 and the bracket 204.

Further, when the housing 202 rotates relative to the bracket 204 during the second assembly operation, the bracket 204 presses the spring-loaded pin 406 into the housing 202. Specifically, the tapered side surface 412 contacts an end 710 of the slot 312 opposite the enlarged circumferential end 310. Accordingly, the tapered side surface 412 slides against the end 710 of the slot 312, which pushes the spring-loaded pin 406 into the housing 202 (e.g., under the bracket 204). When the rotation aligns the spring-loaded pin 406 with the orifice 308, the spring-loaded pin 406 extends at least partially through the orifice 308 to help secure the housing 202 and the bracket 204 in a predetermined position.

Although discussed in connection with the bracket 204 of FIGS. 2-4, FIG. 7 and the discussion associated therewith is also applicable to the second example bracket 602 of FIG. 6. The only difference relative to the first example bracket 204 is that the spring-loaded pin 406 starts under the second example bracket 602 after the first assembly operation. Thus, with the second example bracket 602, the spring-loaded pin 406 does not slide from a starting position in the slot 312 under the bracket 204 before entering the orifice 308 between the first assembly operation and the second assembly operation. Instead, the bracket 602 presses the spring-loaded pin 406 into the housing 202 as a result of the first assembly operation.

Figure 8:
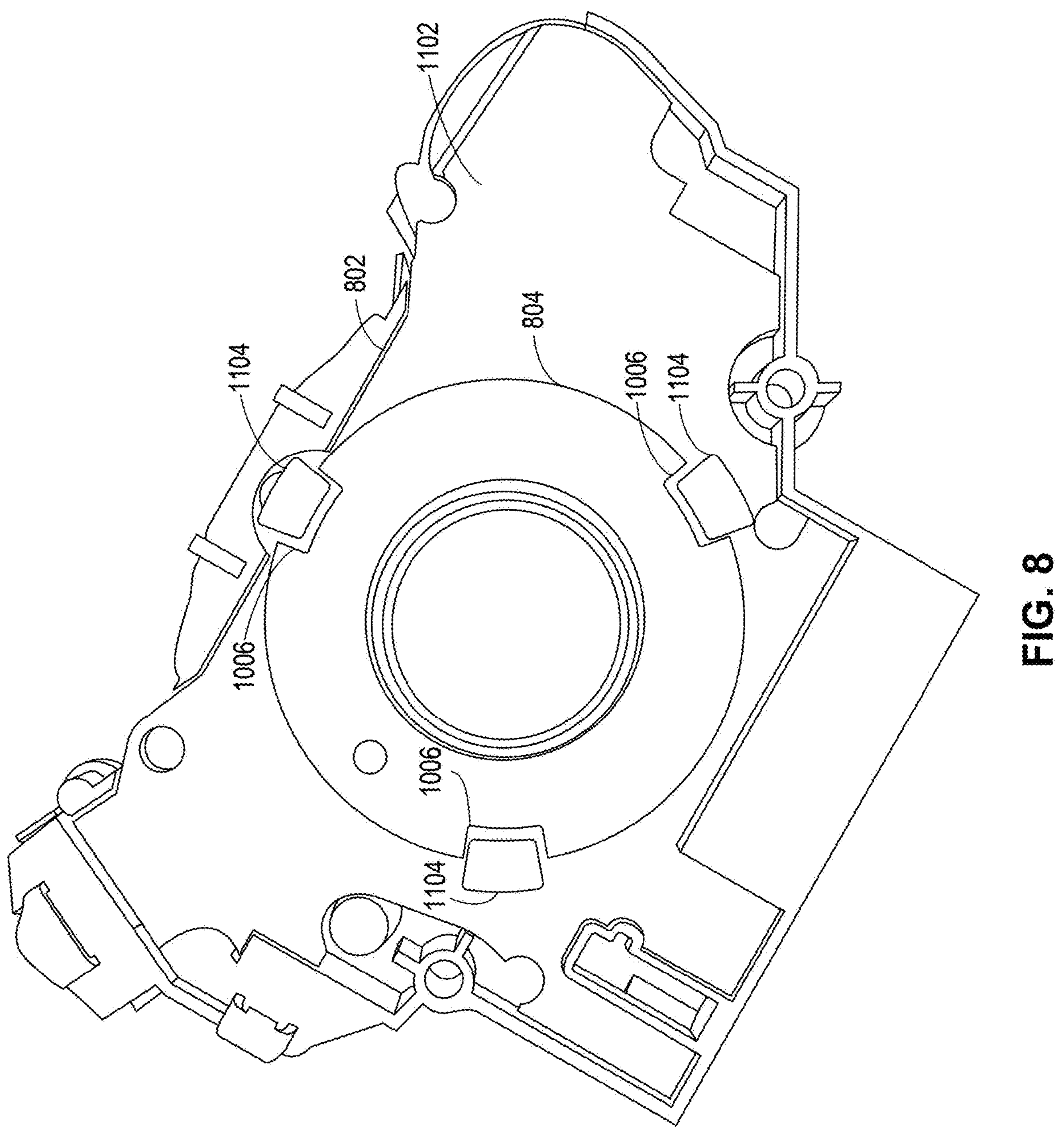
FIG. 8 is an isolated view of a second example housing and a third example bracket that can be implemented in the vehicle system of FIG. 1.

FIG. 8 is an isolated view of a second example housing 802 and a third example bracket 804 that can be implemented in the vehicle system 100 of FIG. 1. Specifically, the bracket 804 can be fixed to the steering column assembly 102 and coupled to the housing 802, which is an example implementation of the housing 106 of FIG. 1. For example, the bracket 804 can be fixedly coupled to and extend radially outward from the steering column jacket 112. In the illustrated example of FIG. 8, the bracket 804 and the housing 802 are shown in a first assembly position. The housing 802 is translated relative to the bracket 804 to obtain the first assembly position of FIG. 8.

Figure 9:
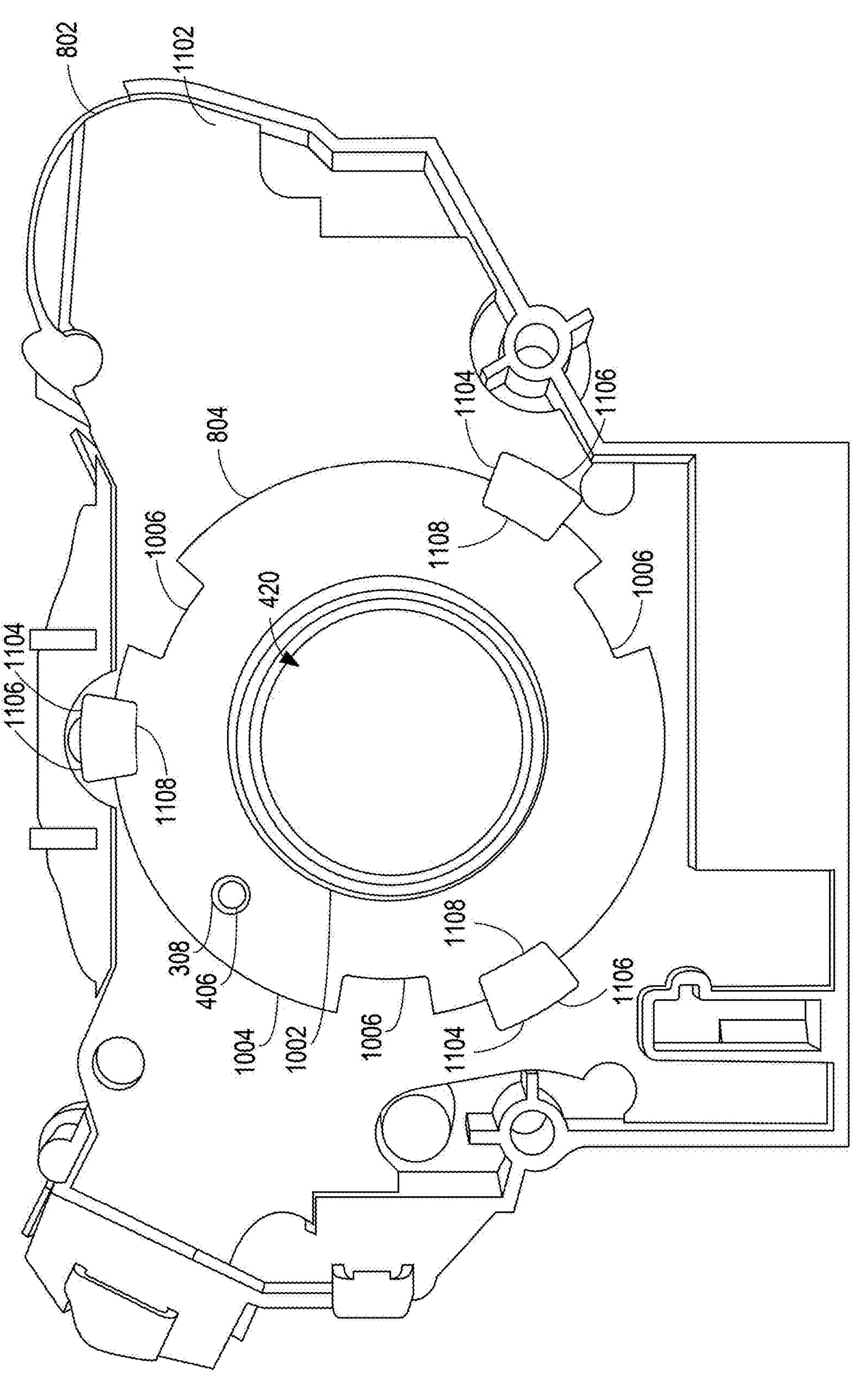
FIG. 9 is another isolated view of the second example housing and the third example bracket that can be implemented in the vehicle system of FIG. 1.

FIG. 9 is an isolated view of the housing 802 coupled to the bracket 804. The housing 802 is rotated relative to the bracket 804 from the first assembly position of FIG. 8 to a second assembly position of FIG. 9 in which the housing 802 is coupled to the bracket 804, as discussed in further detail below.

Figure 10:
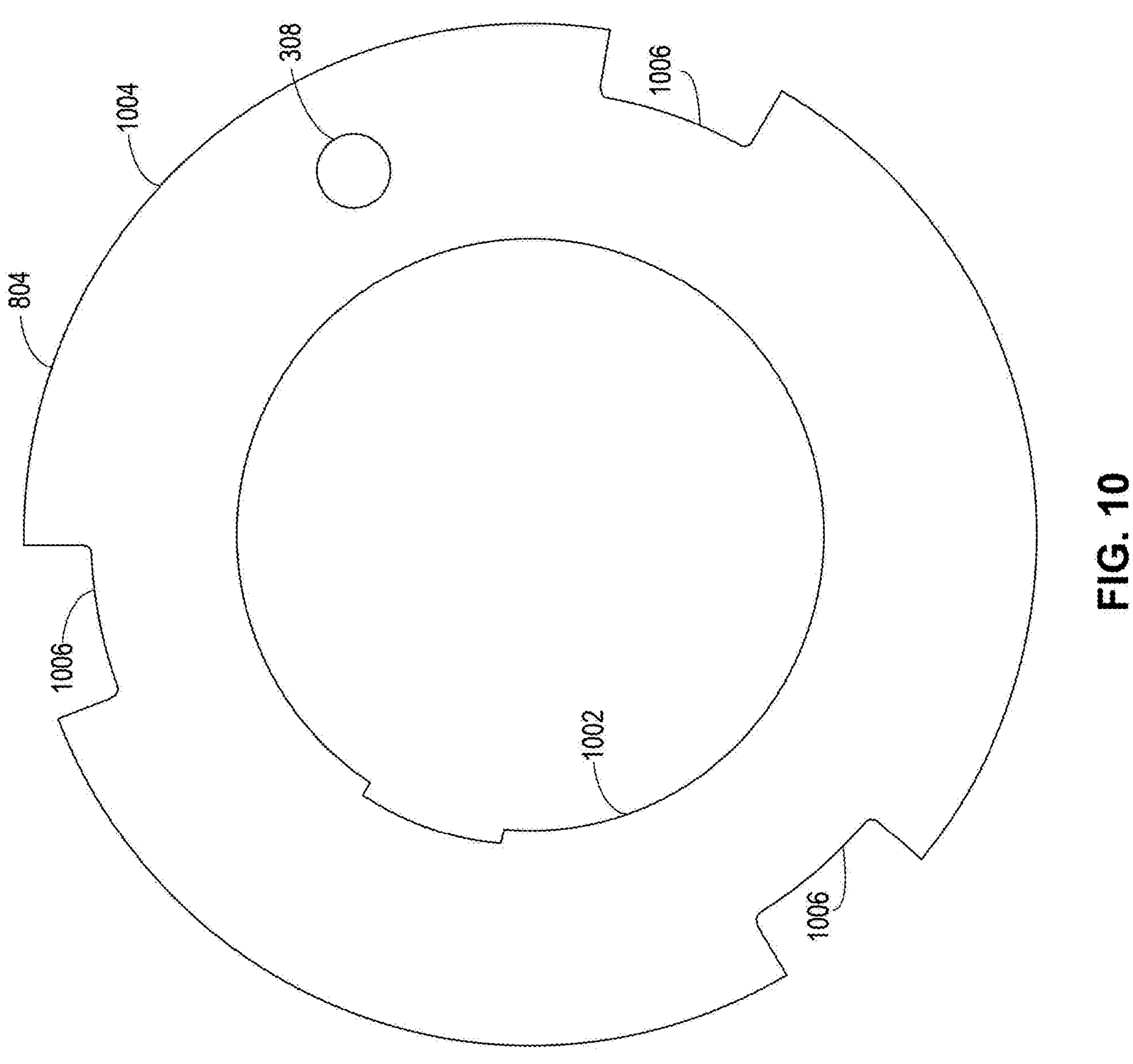
FIG. 10 is an isolated view of the third example bracket of FIGS. 8-9.

FIG. 10 is an isolated view of the bracket 804 of FIGS. 8-9. The bracket 804 includes an inner perimeter 1002 and an outer perimeter 1004, apertures 1006, and the orifice 308. In this example, the apertures 1006 are notches (e.g., insertion indents) defined in the outer perimeter 1004. Accordingly, the bracket 804 can have a first radius extending to the outer perimeter 1004 at the apertures 1006 and a second radius greater than the first radius extending to a portion of the outer perimeter 1004 not aligned with the apertures 1006.

Figure 11:
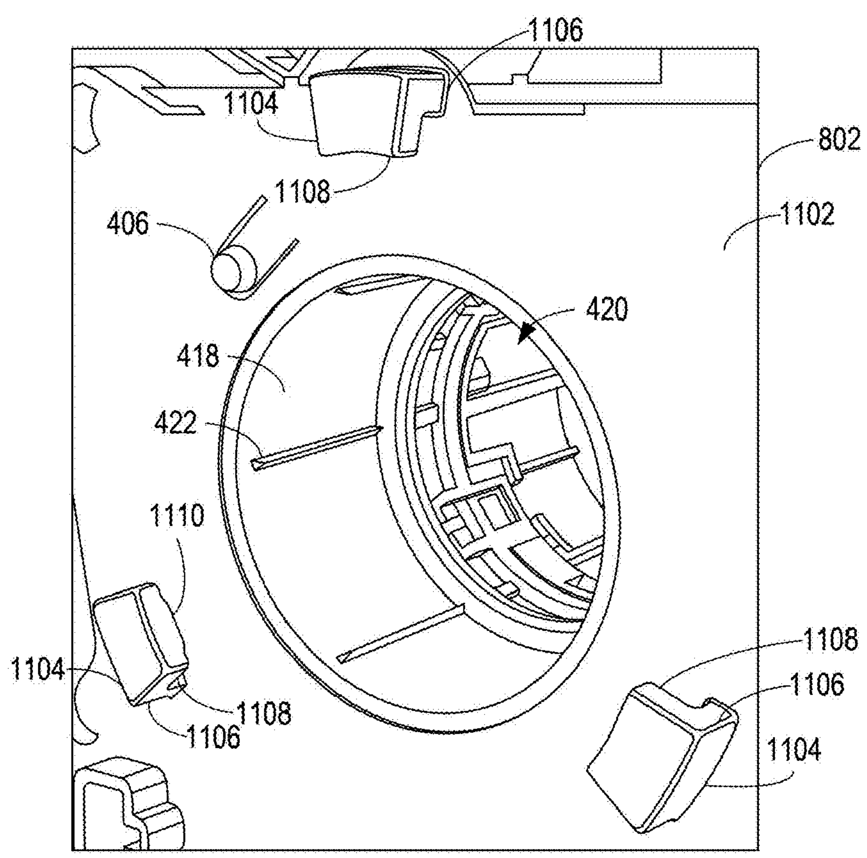
FIG. 11 is an isolated view of the second example housing of FIGS. 8-9.

FIG. 11 is an isolated view of the housing 802. The housing 802 includes a surface 1102 and projections 1104 extending from the surface 1102. Additionally, the housing 802 includes the spring-loaded pin 406 defined in the surface 1102, the tubular surface 418, the radial projections 422, and the orifice 420 in which a portion of the steering column assembly 102 is to be positioned.

Figure 12:
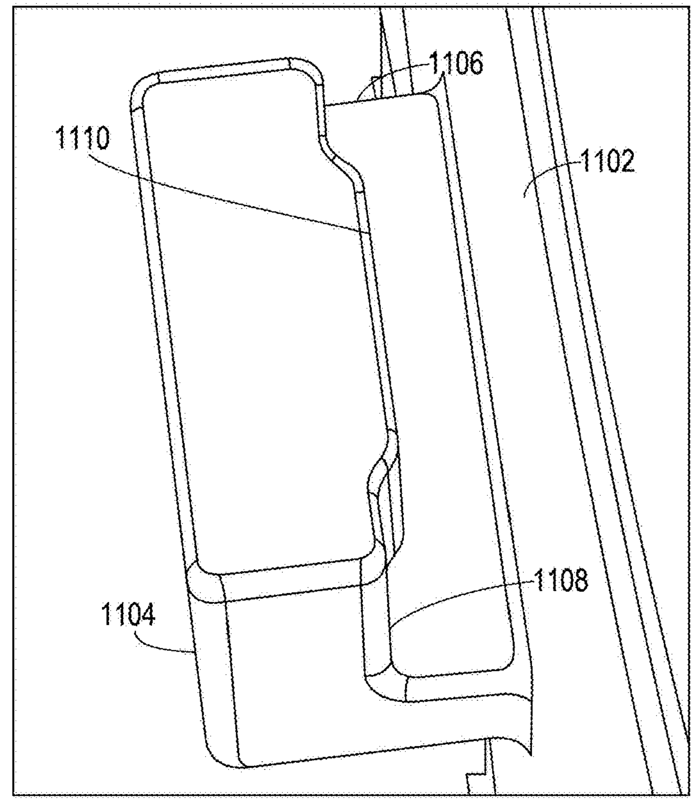
FIG. 12 is a magnified view of an example projection of the second example housing of FIGS. 8-9 and 11.

FIG. 12 is a perspective view of the projections 1104 extending from the surface 1102 of the housing 802. The projections 1104 include a first portion 1106, a second portion 1108, and a third portion 1110. The first portion 1106 is fixed to and extends from the surface 1102. For example, the first portion 1106 can extend from the surface 1102 in a direction normal to the surface 1102. The second portion 1108 extends from the first portion 1106. For example, the second portion 1108 can extend from the first portion 1106 in a direction normal to the first portion 1106. In this example, the second portion 1108 extends from the first portion 1106 towards the orifice 420 (e.g., radially inward). The third portion 1110 extends from the second portion 1108 towards the surface 1102.

In some examples, the second portion 1108 extends from the first portion 1106 at an angle that positions the second portion 1108 closer to the surface 1102 as the separation from the first portion 1106 increases. In such examples, the projections 1104 may not include the third portion 1110.

Returning to the illustrated example of FIG. 8, in the first assembly position, the bracket 804 is positioned against (e.g., in contact with) the surface 1102 of the housing 802. The projections 1104 are aligned with apertures 1006 in a direction normal to the surface 1102. Accordingly, the bracket 804 can translate past the projections 1104 to contact the surface 1102. Further, in the first assembly position of FIG. 8, the bracket 804 presses the spring-loaded pin 406 (FIG. 11) into the housing 802.

After the housing 802 is rotated relative to the bracket 804 from the first assembly position of FIG. 8 to the second assembly position of FIG. 9, the projections 1104 press the bracket 804 against the surface 1102 to form an interference fit and/or a transition fit. Specifically, the second portion 1108 and the third portion 1110 (FIGS. 11-12) of the projections 1104 are positioned between the inner perimeter 1002 and the outer perimeter 1004 in a direction normal to the surface 1102. As such, the third portion 1110 contacts the bracket 804 and presses the bracket 804 against the surface 1102 to form the interference fit and/or the transition fit. The first portion 1106 of the projections 1104 is positioned outside (e.g., radially outward) of the outer perimeter 1004. In some examples, the first portion 1106 contacts the outer perimeter 1004 of the bracket 804 to form another interference fit and/or transition fit between the housing 802 and the bracket 804. Additionally, after the housing 802 is rotated relative to the bracket 804 to the second assembly position of FIG. 9, the spring-loaded pin 406 protrudes into the orifice 308 to help secure a relative position of the housing 802 and the bracket 804. When the housing 802 is coupled to the bracket 804, the steering column assembly 102 extends through the orifice 420, and the radial projections 422 (FIG. 11) contact the steering column jacket 112 to prevent or otherwise reduce radial movement thereof.

Figure 13:
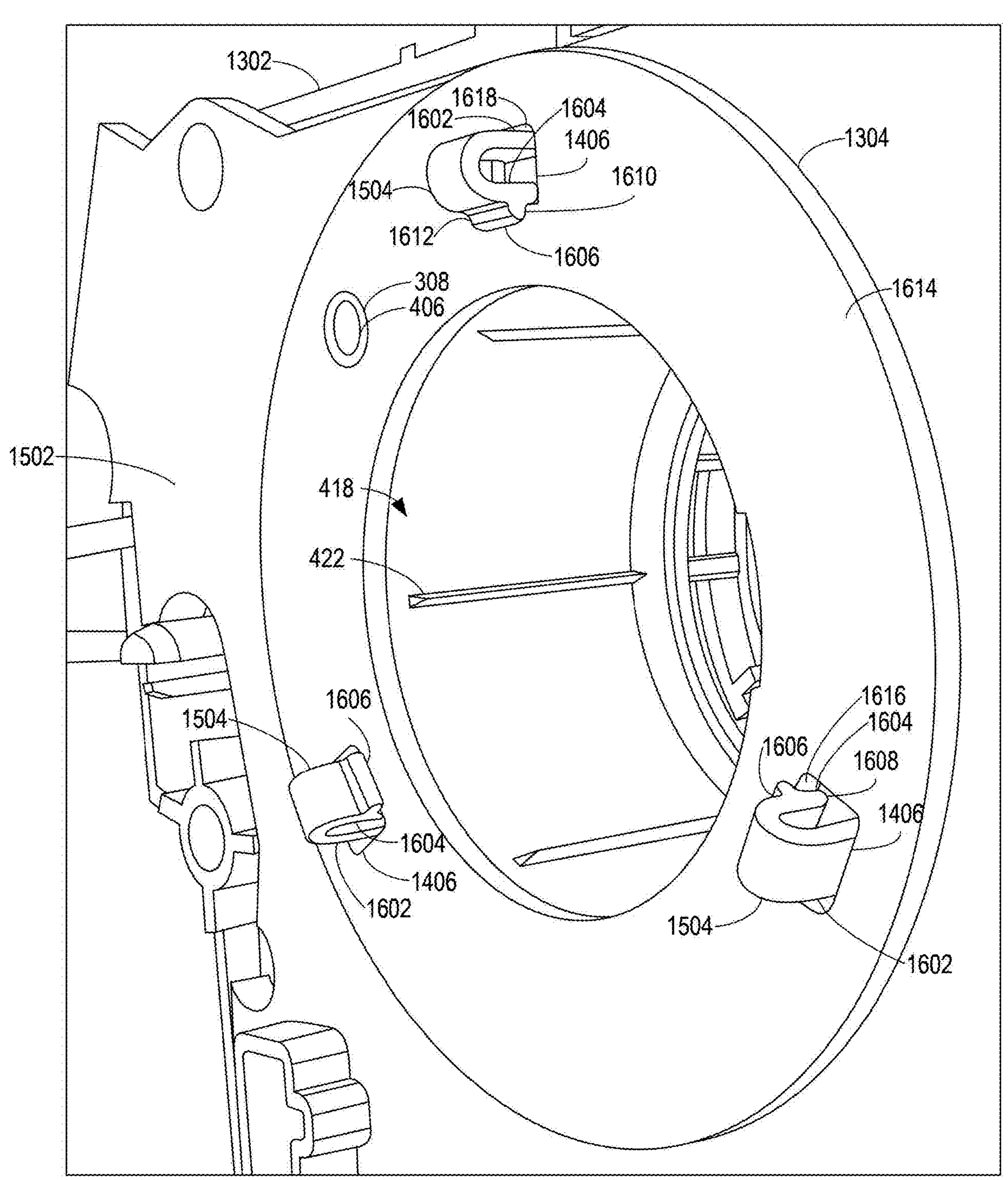
FIG. 13 is an isolated view of a third example housing and a fourth example bracket that can be implemented in the vehicle system of FIG. 1.

FIG. 13 is an isolated view of a third example housing 1302 and a fourth example bracket 1304 that can be implemented in the vehicle system 100 of FIG. 1. Specifically, the bracket 1304 can be fixed to the steering column assembly 102 of FIG. 1 and coupled to the housing 1302, which is an example implementation of the housing 106 of FIG. 1. For example, the bracket 1304 can be fixedly coupled to and extend radially outward from the steering column jacket 112 of FIG. 1.

Figure 14:
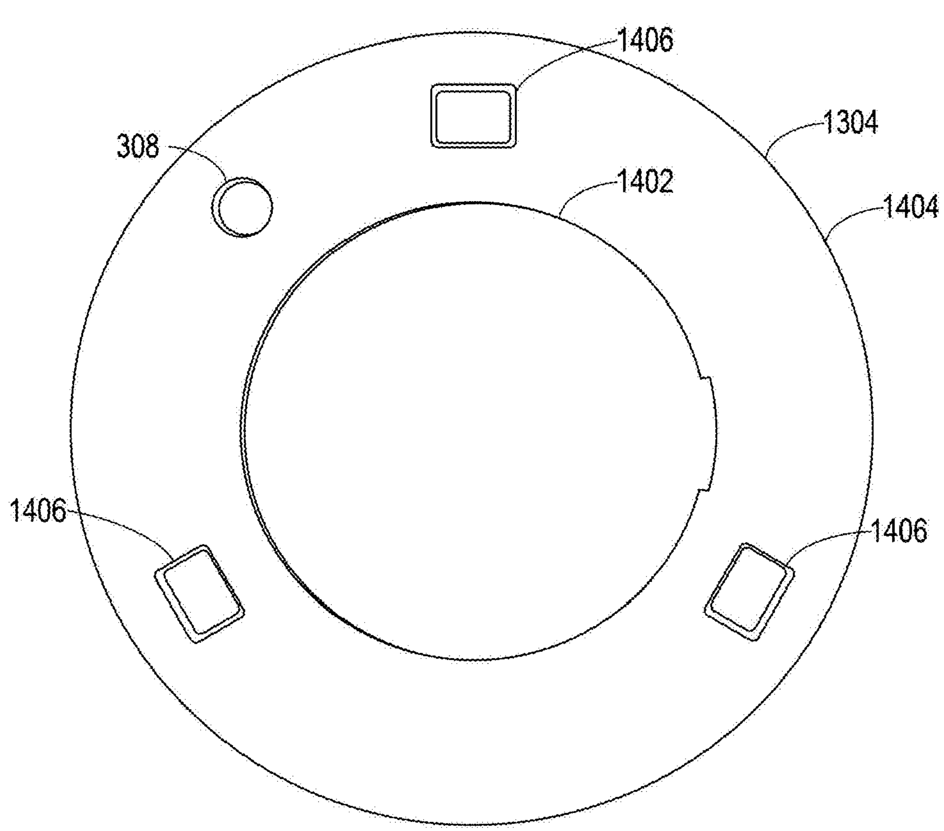
FIG. 14 is an isolated view of the fourth example bracket of FIG. 13.

FIG. 14 is an isolated view of the bracket 1304 of FIG. 13. The bracket 1304 includes an inner perimeter 1402, an outer perimeter 1404, apertures 1406, and the orifice 308. In this example, the apertures 1406 are defined between the inner perimeter 1402 and the outer perimeter 1404, similar to the orifice 308.

Figure 15:
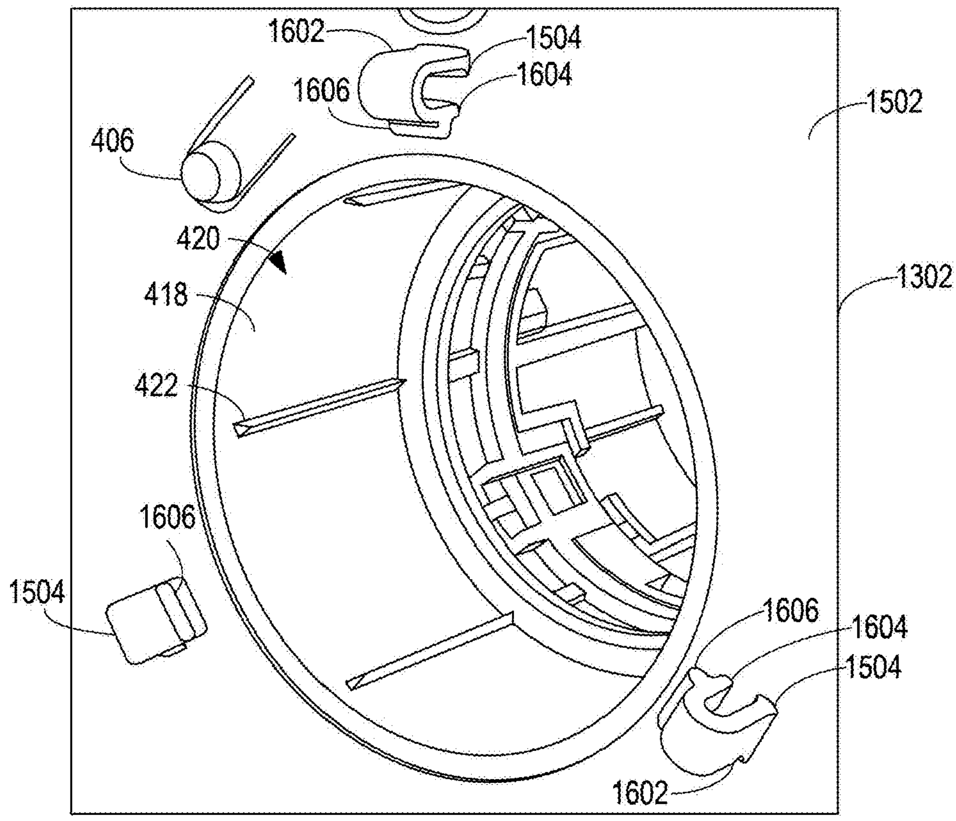
FIG. 15 is an isolated view of the third example housing of FIG. 13.

FIG. 15 is an isolated view of the housing 1302 of FIG. 13. The housing 1302 includes a surface 1502, projections 1504 extending from the surface 1502, the spring-loaded pin 406 defined in the surface 1502, the tubular surface 418, the orifice 420, and the radial projections 422.

Figure 16:
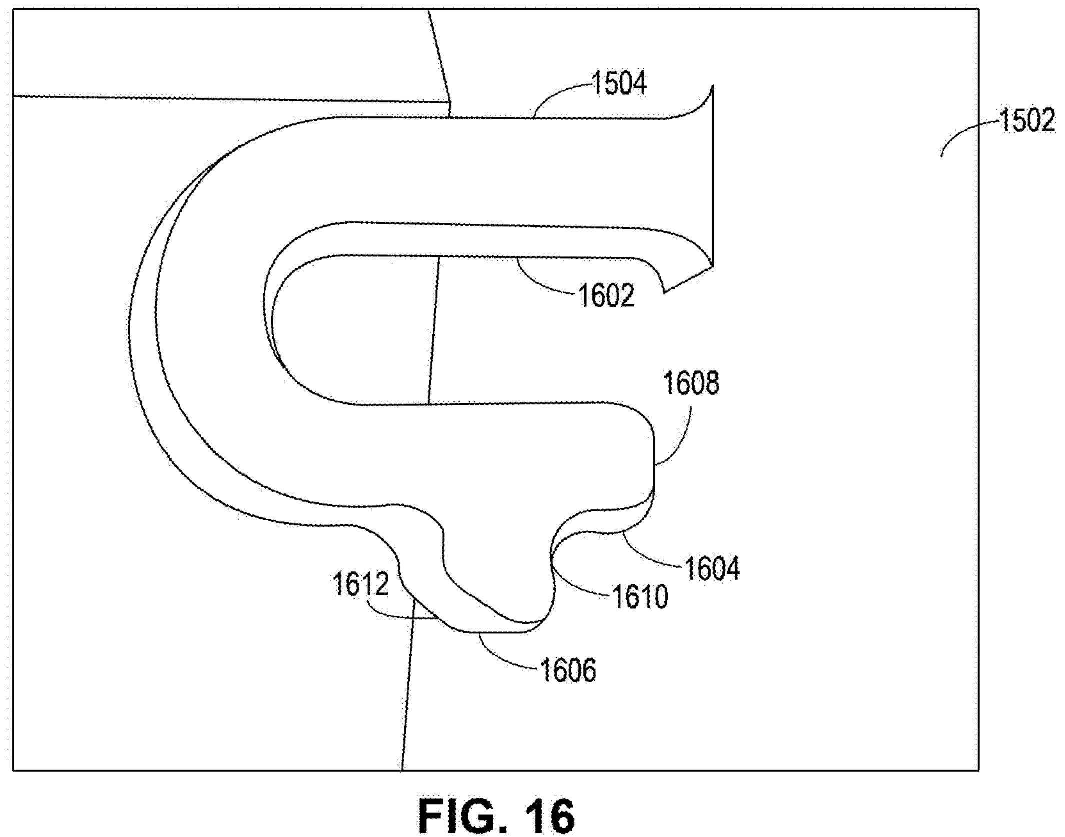
FIG. 16 is a magnified view of an example projection of the housing of FIGS. 13 and 15.

FIG. 16 is a perspective view of the projections 1504 extending from the surface 1502 of the housing 1302. The projections 1504 include a first portion 1602 (e.g., a fixed portion, a fixed side), a second portion 1604 (e.g., a movable portion, a movable side), and a third portion 1606. The first portion 1602 is fixed to and extends from the surface 1502. For example, the first portion 1602 can extend from the surface 1502 in a direction normal to the surface 1502. The second portion 1604 extends from the first portion 1602. For example, the second portion 1604 can extend from the first portion 1602 towards the surface 1502. An end 1608 of the second portion 1604 closest to the surface 1502 is separated from the surface 1502 to enable the second portion 1604 to move relative to (e.g., towards) the first portion 1602. Specifically, a distance from the end 1608 to the surface 1502 is less than a thickness of the bracket 1304.

The third portion 1606 of the projections 1504 extends from the second portion 1604. Specifically, in this example, the third portion 1606 extends in a direction away from the first portion 1602 and at least partially parallel to the surface 1502. The third portion 1606 is positioned further than the end 1608 from the surface 1502. The third portion 1606 includes a first side 1610 (e.g., a first surface) and a second side 1612 (e.g., a second surface). The first side 1610 faces the surface 1502. The second side 1612 is angled and faces away from the surface 1502. Specifically, the third portion 1606 includes a taper (e.g., a tapered surface) to increase a distance that the third portion 1606 extends from the second portion 1604 as separation from the surface 1502 is reduced.

In the illustrated example of FIGS. 13-16, during assembly, the housing 1302 is translated relative to the bracket 1304 to couple the housing 1302 to the bracket 1304. Specifically, the apertures 1406 are aligned with and receive the projections 1504 during the translation. Additionally, as the bracket 1304 approaches the surface 1502, a surface of the bracket 1304 contacts the second side 1612 of the third portion 1606 of the projections 1504. The taper in the second side 1612 enables the bracket 1304 to push the second portion 1604 of the projections 1504 towards the first portion 1602, thereby enabling the bracket 1304 to move past the third portion 1606. After the bracket 1304 moves past the second side 1612 and contacts the surface 1502, a bias in the projections 1504 causes the second portion 1604 to move away from the first portion 1602 (e.g., towards an original, unbiased position). As a result, the third portion 1606 is positioned over the bracket 1304. Specifically, a first surface (not shown) of the bracket 1304 contacts the surface 1502 of the housing 1302, and a second surface 1614 of the bracket 1304 contacts the first side 1610 of the third portion 1606 of the projections 1504. A distance between the first side 1610 of the third portion 1606 and the surface 1502 of the housing 1302 and a thickness of the bracket 1304 are approximately equivalent to enable the third portion 1606 to maintain a position of the bracket 1304 in a direction normal to the surface 1502. As such, the third portion 1606 of the projections 1504 and the bracket 1304 form an interference fit and/or a transition fit.

Further, the second portion 1604 of the projections 1504 between the end 1608 and the third portion 1606 contacts and presses against the bracket 1304 (e.g., against an inner radial surface 1616 of the apertures 1406). Additionally, the first portion 1602 of the projections 1504 can contact the bracket 1304 (e.g., at an outer radial surface 1618 of the apertures 1406) to help stabilize a position of the bracket 1304 relative to the housing 1302. Furthermore, the spring-loaded pin 406 protrudes into the orifice 308 to help secure a relative position of the housing 1302 and the bracket 1304. Additionally, the radial projections 422 contact the steering column jacket 112 to prevent or otherwise reduce radial movement thereof in the orifice 420.

Figure 17:
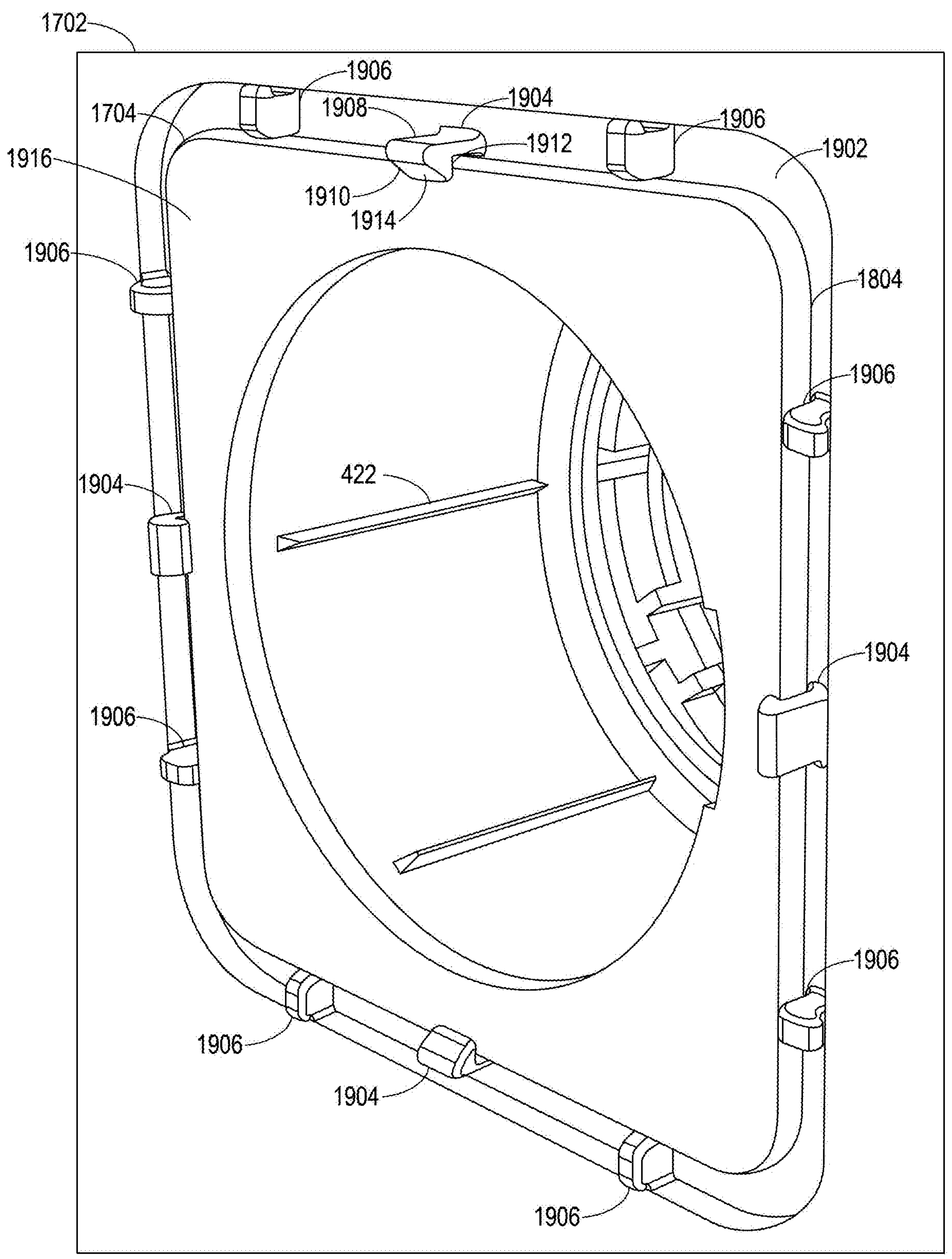
FIG. 17 is an isolated view of a fourth example housing and a fifth example bracket that can be implemented in the vehicle system of FIG. 1.

FIG. 17 is an isolated view of a portion of a fourth example housing 1702 and a fifth example bracket 1704 that can be implemented in the vehicle system 100 of FIG. 1. Specifically, the bracket 1704 can be fixed to the steering column assembly 102 and coupled to the housing 1702, which is an example implementation of the housing 106 of FIG. 1. For example, the bracket 1704 can be fixedly coupled to and extend radially outward from the steering column jacket 112 of FIG. 1.

Figures 18, 19:
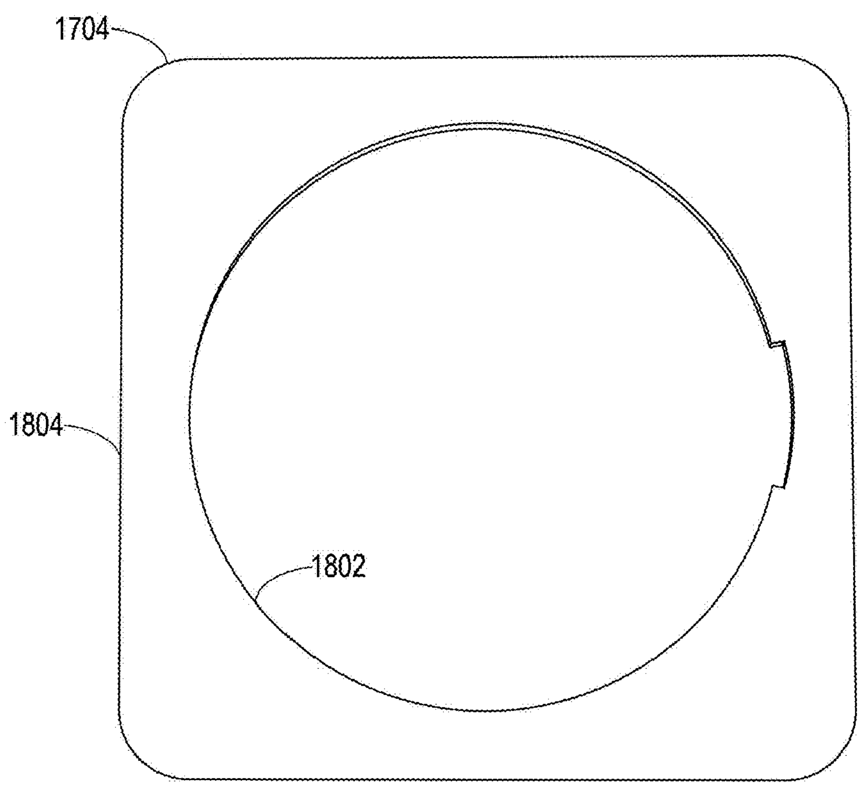
FIG. 18 is an isolated view of the fifth example bracket of FIG. 17.
FIG. 19 is an isolated view of the fourth example housing of FIG. 17.

FIG. 18 is an isolated view of the bracket 1704 of FIG. 17. The bracket 1704 includes an inner perimeter 1802 and an outer perimeter 1804.

FIG. 19 is an isolated view of the fourth example housing of FIG. 17. The housing 1702 includes a surface 1902, first projections 1904 extending from the surface 1502, second projections 1906 extending from the surface 1502, and the orifice 420 in which a portion of the steering column assembly 102 is to be positioned. The first projections 1904 include a first portion 1908 and a second portion 1910. The first portion 1908 is fixed to and extends from the surface 1902. For example, the first portion 1908 can extend from the surface 1902 in a direction normal to the surface 1902. The second portion 1910 extends from the first portion 1908. For example, the second portion 1910 can extend from the first portion 1908 in a direction normal to the first portion 1908 and parallel to the surface 1902. The second portion 1910 includes a first side 1912 and a second side 1914. The first side 1912 faces the surface 1902. The second portion 1910 includes a taper (e.g., a tapered surface) to increase a distance that the second portion 1910 extends from the first portion 1908 as separation from the surface 1902 is reduced.

A distance between the first side 1912 and the surface 1902 in a direction normal to the surface 1902 is approximately equivalent to a thickness of the bracket 1704. As such, the second portion 1910 of the first projections 1904 and the bracket 1704 can form a transition fit.

In the illustrated example of FIGS. 17-19, the housing 1702 is translated relative to the bracket 1704 to couple the housing 1702 to the bracket 1704. During assembly, the bracket 1704 contacts the second side 1914 of the second portion 1910 of the first projections 1904. As the bracket 1704 moves closer to the surface 1902, the bracket 1704 pushes the second portion 1910 outward, thereby causing the first projections 1904 to flex (e.g., encounter elastic deformation). When the bracket 1704 moves past the second portion 1910 and contacts the surface 1902 of the housing 1702, the first projections 1904 return to the original position associated therewith. As a result, the second portion 1910 is positioned over the bracket 1704. Specifically, the first side 1912 of the second portion is in contact with a first surface 1916 of the bracket 1704, and the surface 1902 of the housing 1702 contacts a second surface (not shown) of the bracket 1704 opposite the first surface 1916.

The second projections 1906 and the first portion 1908 of the first projections 1904 contact the outer perimeter 1804 of the bracket 1704 to help stabilize a position of the bracket 1704 relative to the housing 1702. The second projections 1906 and/or the first portion 1908 of the first projections 1904 can form a transition fit and/or an interference fit with the bracket 1704 in a direction parallel to the surface 1902. Furthermore, the radial projections 422 contact the steering column jacket 112 to prevent or otherwise reduce radial movement thereof in the orifice 420.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

As used herein, a "multifunction switch housing" in a vehicle houses circuitry related to the operation of turn signals, headlights, windshield wipers, interior lights, a washer pump, cruise control, hazard lights, and/or other operations controllable at steering wheel or on a driver's side of a dashboard.

From the foregoing, it will be appreciated that example systems, apparatus, articles of manufacture, and methods have been disclosed that facilitate coupling of a housing to a steering column assembly. Examples disclosed herein include brackets and housings that are coupled via at least one interference fit and/or at least one transition fit. Examples disclosed herein minimize or otherwise reduce an amount of space occupied by the bracket, thereby creating more room for other vehicular components and reducing a weight of a steering column support system. Additionally, examples disclosed herein remove a need for additional parts (e.g., fasteners) to couple the bracket to the housing. Further, examples disclosed herein simplify operations performed to couple the housing to the bracket and, in turn, the steering column assembly. Specifically, the housing can be coupled to the bracket via a movement including solely translation or via a movement consisting of a translation and rotation.

Example methods and apparatus to couple a steering column to a housing are disclosed herein. Further examples and combinations thereof include the following:

Example 1 includes an apparatus comprising a bracket fixed to a steering column assembly, the bracket including a bracket surface, and a housing including projections extending from a housing surface of the housing, the housing surface facing a same direction as the bracket surface, the projections including first portions and second portions, the first portions extending from the housing surface in a first direction, the second portions extending from the first portions in a second direction different than the first direction, the second portions of the projections to overlap the bracket surface.

Example 2 includes the apparatus of example 1, wherein the housing includes an orifice in which the steering column assembly is to be positioned, and wherein the second portions of the projections extend from the first portions towards the steering column assembly.

Example 3 includes the apparatus of any preceding example, wherein the housing includes radial de-lash projections extending from a tubular surface to be positioned around the steering column assembly when the housing is coupled to the bracket, the radial de-lash projections to be in contact with the steering column assembly.

Example 4 includes the apparatus of any preceding example, wherein the projections include third portions extending from the second portions towards the bracket surface.

Example 5 includes the apparatus of any preceding example, wherein the housing is coupled to the bracket via a translation of the housing relative to the bracket.

Example 6 includes the apparatus of any preceding example, wherein the housing is coupled to the bracket via translation and rotation of the housing relative to the bracket.

Example 7 includes the apparatus of any preceding example, wherein the housing includes a spring-loaded pin positioned in an orifice of the bracket when the housing is coupled to the bracket.

Example 8 includes the apparatus of any preceding example, wherein the bracket includes insertion indents defined in a perimeter of the bracket, wherein the second portions of the projections align with the insertion indents during translation of the housing relative to the bracket.

Example 9 includes the apparatus of any preceding example, wherein the second portions of the projections are positioned over the bracket surface after rotation of the housing relative to the bracket.

Example 10 includes an apparatus comprising a bracket extending radially outward from a steering column assembly, the bracket including a first surface and a second surface opposite the first surface, and a housing coupled to the bracket, the housing including a housing surface and projections extending from the housing surface, the first surface of the bracket in contact with the housing surface, the second surface of the bracket in contact with the projections.

Example 11 includes the apparatus of any preceding example, wherein the bracket includes an inner diameter, an outer diameter, and slots defined between the inner diameter and the outer diameter, the slots to receive the projections of the housing.

Example 12 includes the apparatus of any preceding example, wherein each of the slots includes a circumferential end and a channel extending from the circumferential end, wherein the circumferential end receives one if the projections during a first coupling operation, and wherein a portion of the one of the projections is positioned in the channel after a second coupling operation.

Example 13 includes the apparatus of any preceding example, wherein the first coupling operation includes translation of the housing relative to the bracket, and wherein the second coupling operation includes rotation of the housing relative to the bracket.

Example 14 includes the apparatus of any preceding example, wherein each of the projections includes a slit separating a first section and a second section of the projection, and wherein the channel includes a first edge and a second edge, the first edge in contact with the first section, the second edge in contact with the second section.

Example 15 includes the apparatus of any preceding example, wherein each of the projections includes a first portion and a second portion, the first portion extending from the housing surface, the second portion extending from the first portion, the second portion in contact with the second surface of the bracket, wherein the first portion of the projections includes a fixed side and a movable side, wherein the second portion of the projections extends from the movable side away from the fixed side.

Example 16 includes the apparatus of any preceding example, wherein the second portion of the projection includes a tapered surface against which the bracket during coupling.

Example 17 includes the apparatus of any preceding example, wherein the tapered surface faces away from the bracket when the bracket is coupled to the housing.

Example 18 includes the apparatus of any preceding example, wherein each of the projections includes a first portion and a second portion, the first portion extending from the housing surface, the second portion extending from the first portion, the bracket including a third surface defining an outer perimeter of the bracket, and wherein the first portion of the projections is in contact with the third surface.

Example 19 includes a vehicle comprising a steering column assembly including a steering column, a bracket fixedly coupled to the steering column assembly, the bracket including a first surface and a second surface opposite the first surface, and a housing coupled to the bracket, the housing including a housing surface and projections extending from the housing surface, the bracket positioned between the housing surface and the projections.

Example 20 includes the vehicle of any preceding example, wherein the housing is a multifunction switch housing.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:

a bracket fixed to a steering column assembly, the bracket including a bracket surface; and a housing including projections extending from a housing surface of the housing, the housing surface facing a same direction as the bracket surface, the projections including first portions and second portions, the first portions extending from the housing surface in a first direction, the second portions extending from the first portions in a second direction different than the first direction, the second portions of the projections to overlap the bracket surface.

2. The apparatus of claim 1, wherein the housing includes an orifice in which the steering column assembly is to be positioned, and wherein the second portions of the projections extend from the first portions towards the steering column assembly.

3. The apparatus of claim 2, wherein the housing includes radial de-lash projections extending from a tubular surface to be positioned around the steering column assembly when the housing is coupled to the bracket, the radial de-lash projections to be in contact with the steering column assembly.

4. The apparatus of claim 1, wherein the projections include third portions extending from the second portions towards the bracket surface.

5. The apparatus of claim 1, wherein the housing is coupled to the bracket via a translation of the housing relative to the bracket.

6. The apparatus of claim 1, wherein the housing is coupled to the bracket via translation and rotation of the housing relative to the bracket.

7. The apparatus of claim 1, wherein the housing includes a spring-loaded pin positioned in an orifice of the bracket when the housing is coupled to the bracket.

8. The apparatus of claim 1, wherein the bracket includes insertion indents defined in a perimeter of the bracket, wherein the second portions of the projections align with the insertion indents during translation of the housing relative to the bracket.

9. The apparatus of claim 8, wherein the second portions of the projections are positioned over the bracket surface after rotation of the housing relative to the bracket.

10. The apparatus of claim 1, wherein the second portions of the projections contact the bracket surface.

11. An apparatus comprising:

a bracket extending radially outward from a steering column assembly, the bracket including a first surface and a second surface opposite the first surface; and a housing coupled to the bracket, the housing including a housing surface and projections extending from the housing surface, the first surface of the bracket in contact with the housing surface, the second surface of the bracket in contact with the projections.

12. The apparatus of claim 11, wherein the bracket includes an inner diameter, an outer diameter, and slots defined between the inner diameter and the outer diameter, the slots to receive the projections of the housing.

13. The apparatus of claim 12, wherein each of the slots includes a circumferential end and a channel extending from the circumferential end, wherein the circumferential end receives one if the projections during a first coupling operation, and wherein a portion of the one of the projections is positioned in the channel after a second coupling operation.

14. The apparatus of claim 13, wherein the first coupling operation includes translation of the housing relative to the bracket, and wherein the second coupling operation includes rotation of the housing relative to the bracket.

15. The apparatus of claim 13, wherein each of the projections includes a slit separating a first section and a second section of the projection, and wherein the channel includes a first edge and a second edge, the first edge in contact with the first section, the second edge in contact with the second section.

16. The apparatus of claim 11, wherein each of the projections includes a first portion and a second portion, the first portion extending from the housing surface, the second portion extending from the first portion, the second portion in contact with the second surface of the bracket, wherein the first portion of the projections includes a fixed side and a movable side, wherein the second portion of the projections extends from the movable side away from the fixed side.

17. The apparatus of claim 16, wherein the second portion of the projection includes a tapered surface against which the bracket moves during coupling.

18. The apparatus of claim 17, wherein the tapered surface faces away from the bracket when the bracket is coupled to the housing.

19. The apparatus of claim 11, wherein each of the projections includes a first portion and a second portion, the first portion extending from the housing surface, the second portion extending from the first portion, the bracket including a third surface defining an outer perimeter of the bracket, and wherein the first portion of the projections is in contact with the third surface.

20. A vehicle comprising:

a steering column assembly including a steering column;

a bracket fixedly coupled to the steering column assembly, the bracket including a first surface and a second surface opposite the first surface; and a multifunction switch housing coupled to the bracket, the multifunction switch housing including a housing surface and projections extending from the housing surface, the bracket positioned between the housing surface and the projections.

* * * * *